(12) United States Patent
Bouchard et al.

(10) Patent No.: US 8,611,932 B2
(45) Date of Patent: Dec. 17, 2013

(54) AUTOMATED AUTONOMY INCREASING SYSTEM AND METHOD FOR COMMUNICATION DEVICES

(75) Inventors: Geneviève Bouchard, Lévis (CA); Jonathan Gagne, Québec (CA); Alain Moisan, Saint-Augustin-de-Desmaures (CA); Jean-François Montplaisir, Québec (CA)

(73) Assignee: Recherche et Developpement Everon CA Inc., Quebec (CA)

( * ) Notice: Subject to any disclaimer, the term of this patent is extended or adjusted under 35 U.S.C. 154(b) by 1179 days.

(21) Appl. No.: 11/915,767

(22) PCT Filed: Jun. 2, 2006

(86) PCT No.: PCT/CA2006/000923
§ 371 (c)(1),
(2), (4) Date: Nov. 28, 2007

(87) PCT Pub. No.: WO2006/128308
PCT Pub. Date: Dec. 7, 2006

(65) Prior Publication Data
US 2008/0214228 A1     Sep. 4, 2008

Related U.S. Application Data

(60) Provisional application No. 60/686,421, filed on Jun. 2, 2005.

(51) Int. Cl.
*H04W 24/00* (2009.01)
(52) U.S. Cl.
USPC ............... 455/456.4; 455/522; 455/404.2; 455/414.1; 455/422.1; 455/421; 455/418; 455/456.1; 455/456.2; 455/456.3; 455/456.5; 455/456.6

(58) Field of Classification Search
USPC ........ 455/522, 404.2, 414.1, 422.1, 421, 418, 455/456.1, 456.2, 456.3, 456.4, 456.5, 455/456.6
See application file for complete search history.

(56) References Cited

U.S. PATENT DOCUMENTS

| | | | |
|---|---|---|---|
| 5,208,756 A * | 5/1993 | Song ........................ | 455/456.3 |
| 6,134,314 A * | 10/2000 | Dougherty et al. ...... | 379/201.01 |
| 6,343,212 B1 | 1/2002 | Weber et al. | |
| 6,343,213 B1 | 1/2002 | Steer et al. | |
| 6,445,925 B1 * | 9/2002 | Kwon et al. ................. | 455/446 |

(Continued)

FOREIGN PATENT DOCUMENTS

| | | |
|---|---|---|
| JP | 11215561 | 8/1999 |
| JP | 2000287259 | 10/2000 |

(Continued)

*Primary Examiner* — Khalid Shaheed
(74) *Attorney, Agent, or Firm* — Price Heneveld LLP

(57) ABSTRACT

A method for automatic powering on and turning off of a communications device, comprising: defining a critical zone to be one of within or outside a range of a base station transceiver; sending a location message from one of the communications device and the base station transceiver; responding to the location message if the communications device is within the range; defining a location of the communications device to be within the range if the responding occurs; and triggering the communications device to one of powering on and turning off using the critical zone and the location of the communications device.

23 Claims, 6 Drawing Sheets

(56) References Cited

U.S. PATENT DOCUMENTS

| | | |
|---|---|---|
| 6,570,532 B2 * | 5/2003 | Mise et al. .................. 342/357.4 |
| 6,832,093 B1 * | 12/2004 | Ranta .......................... 455/456.4 |
| 2002/0039896 A1 | 4/2002 | Brown |
| 2002/0090953 A1 * | 7/2002 | Aburai et al. ................. 455/456 |
| 2002/0164979 A1 * | 11/2002 | Mooney et al. ............... 455/417 |
| 2003/0013444 A1 * | 1/2003 | Watanabe et al. ............. 455/435 |
| 2003/0224803 A1 | 12/2003 | Konno |
| 2004/0029560 A1 | 2/2004 | Ariga |
| 2004/0202329 A1 * | 10/2004 | Jung et al. ..................... 380/273 |
| 2005/0260994 A1 | 11/2005 | Losch |

FOREIGN PATENT DOCUMENTS

| | | |
|---|---|---|
| JP | 2001346260 | 12/2001 |
| JP | 2003174683 | 6/2003 |
| JP | 2004048550 | 2/2004 |
| WO | 9825433 | 6/1998 |

* cited by examiner

AUTOMATED AUTONOMY INCREASING SYSTEM AND METHOD FOR COMMUNICATION DEVICES

CROSS-REFERENCE TO RELATED APPLICATIONS

This patent application is a national phase entry of international patent application no. PCT/CA2006/000923 filed on Jun. 2, 2006 and published under no. WO 2006/128308 which claims priority on U.S. Provisional Application No. 60/686,421 filed on Jun. 2, 2005, by the present Applicants, both of which are incorporated by reference herein.

BACKGROUND OF THE INVENTION

1. Field of the Invention

The present invention is related to the field of increasing autonomy life of personal communications devices. More specifically, it relates to shutting down the personal communications device when the user is in or out of a pre-determined zone.

2. Description of the Prior Art

An increasing number of people want their children to have a cellular phone or another personal communication device for safety reasons. In parallel, more and more personal communication devices are used as tracking devices for people with different cognitive problems. These communications devices are, typically, to be used when the users are outside their homes.

Personal communications devices do not have a very long battery life. Recharging the device repeatedly may not be a priority for young or disabled users. The devices are therefore often automatically put in a shut down mode caused by lack of energy in the batteries.

In order to solve this problem, some users have taken the habit of turning off their cellular phones as soon as they enter their home and turning it back on as soon as they leave their home. Some even benefit from a call forward feature in which when the device is turned off, all calls are forwarded to a land line (typically, that of their home). The user must have the discipline to turn on and off his device and must not forget to turn it on or off, even when distracted. Often, the cellular device will stay turned off for days before the user realizes he forgot to turn it back on or will stay on for days before entering a shut down mode cause by lack of energy in the batteries. Another problem is that people with cognitive problems or children do not always have the knowledge or the capacity to turn on and off their phone.

SUMMARY

In accordance with a first broad aspect of the present invention, there is provided a method for automatic powering on and turning off of a communications device, comprising: defining a critical zone to be one of within or outside a range of a base station transceiver; sending a location message from one of the communications device and the base station transceiver; responding to the location message if the communications device is within the range; defining a location of the communications device to be within the range if the responding occurs; and triggering the communications device to one of powering on and turning off using the critical zone and the location of the communications device.

In accordance with a second broad aspect of the present invention, there is provided a system for automatic powering on and turning off of a communications device, comprising: a base station transceiver having a range and comprising: a zone definer for defining a critical zone to be one of within or outside the range; a base station transmitter for transmitting a message to a communications device; a base station receiver for receiving a message from the communications device; and a communications device comprising: a device transmitter for transmitting a message to the base station; a device receiver for receiving a message from the base station; a location determiner for defining a location of the communications device to be within the range if a message is received by the device receiver from the base station transmitter; a state modifier for triggering the communications device to one of powering on and turning off using the critical zone and the location of the communications device.

The term "Personal communications device" is intended to include a cellular telephone, a mobile device, any type of personal digital assistant with communications abilities, such as a Blackberry™ by RIM, or any other device able to communicate and portable enough to be carried by a user, etc.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The autonomy of the device is increased by creating a zone in which a personal communications device will be automatically turned on or off.

The system enables automatic on/off of a standard communications device based on the presence of a predefined Radio Frequency (RF) signal in the air. A RF signal can typically be received even through walls and windows and has proven particularly useful in the present application although other types of wireless communication means can be contemplated without departing from the invention.

The system has two main components, namely a base station transceiver and an add-on transceiver for the communications device.

A shut down zone will be determined to be within or outside of a communications range of the base station transceiver. Preferably, the base station will be at the user's home and the shut down zone will be the zone within the ranger of the base station transceiver. However, one will readily understand that a plurality of zones could be created for each device and that it might be useful to create a shut down zone which is outside the range of the base station instead of within. Other examples would be the following: shut down the device when the employee has left the workplace, thereby allowing use of the device only on the workplace's premises during work hours, shut down the device when the patient is within the hospital grounds, shut down the device when the mentally ill patient is within the care center's premises, shut down the device when the kid is either at home or at school, shut down the device when the kid is either at his mother's or at his father's home, etc.

In the case where the shut-down zone is a user's home, the user will typically spend 10-12 hours of his day at home and will benefit from an automatic shut-down and power on of his device at the time of transitioning between the outside and the inside of the zone. Since that is almost half a day, the battery life could be extended by as much as 200% if the user did not take the time to shut down the device when arriving at home prior to using this system and will prevent any forgetting of turning on or off the device after a manual change.

Figure 1:
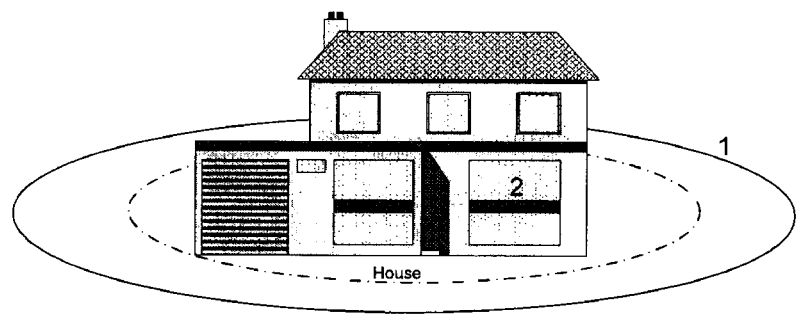
FIG. 1. is an illustration of a home with its associated zones.

In this same example, the preferred shut-down zone will have a radius of 30 to 50 m around the home of the user. That zone is shown as zone 2 (in dotted lines) in FIG. 1. When the device is outside zone 2, either within zone 1 and zone 2 or outside zone 1, the device will be turned on. If the device is within zone 1, the device will be turned off. Preferably, when the device is turned off, a call forward feature of the device, if any, will be activated and the calls to the device will be forwarded to another number, typically to the land line of the home.

Typically, the zones will be circular since a RF transceiver has a circular range. However, deformation of the RF waves will cause the circles to be less than regular, the zone's shape being that of an approximate circle*. The base station transceiver will be at the center of the zone. Therefore, if the base station transceiver is placed at one extremity of the home building, it is possible that the zone will be larger near that extremity and smaller near the opposing extremity. Ideally, the transceiver should be placed near the center of the building.

Figure 2:
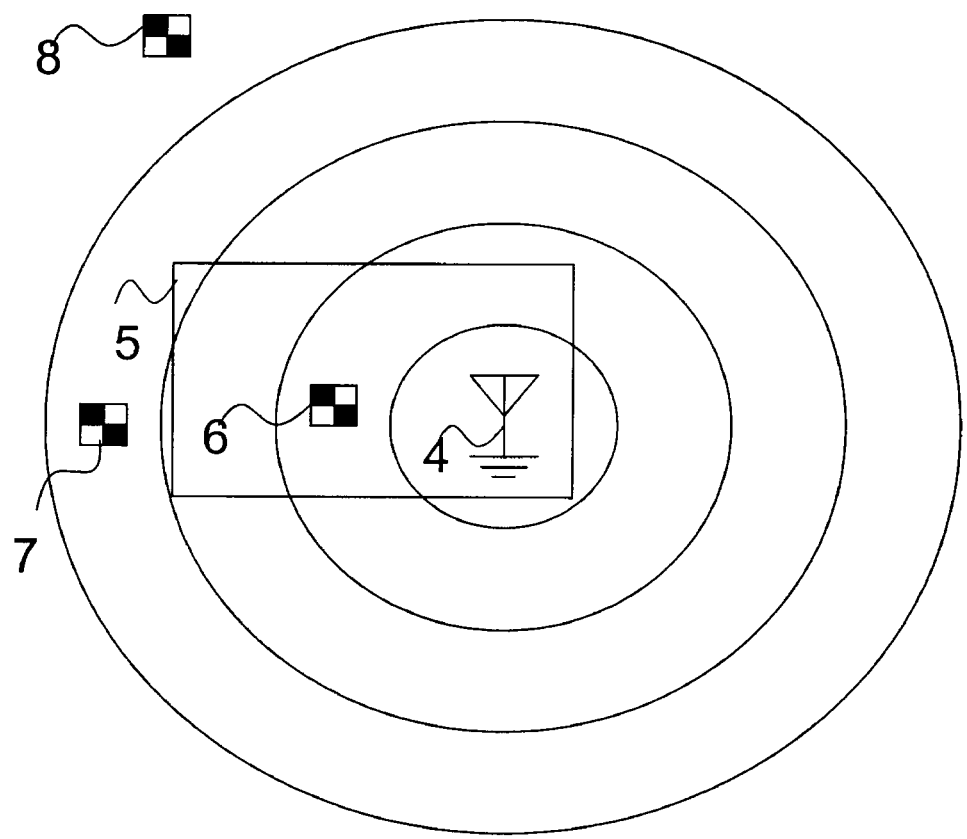
FIG. 2 is an illustration of a base station with a plurality of associated zones.

FIG. 2 shows the zones defined around a base station and illustrates the propagation of the RF waves around the base station, even through walls. The circles are shown to be perfectly round whereas, in reality, the shape of the circles would be deformed. The house perimeter is delimited by rectangle 5. In this particular case, the base station transceiver 4 is located near one corner of the house perimeter and does not have a very broad range. Positions 6 and 7 are within the zone of range of transceiver 4 because the RF waves are able to propagate that far. They are therefore identified as being within ("in") the zone. Position 8 is outside of the transceiver's range, no RF wave is able to reach position 8 and it is therefore identified as being outside ("out") of the zone.

Preferably, as long as the device stays within the zone, the device will not be automatically turned on and off repeatedly. Instead, the trigger to turn the device on or off will be done upon detection of a change in the state of the device, from in to out or from out to in. In FIG. 2, crossing the external circle shown would trigger the turning on or off of the device, depending on the type (shut down or power on) of zone defined for the transceiver 4. Depending on the frequency of verification of the location of the device, if the user was to stay for an extended period of time on the limit of the zone (which is, as one will readily understand, not a physical barrier but an invisible limit), it would be possible for the device to alternate between the power on and shut down states each time the location of the device is checked. However, it will be assumed that the user will not prolong his stay on the boundary of the zone for more than the time between each verification of the location of the device.

Figure 3:
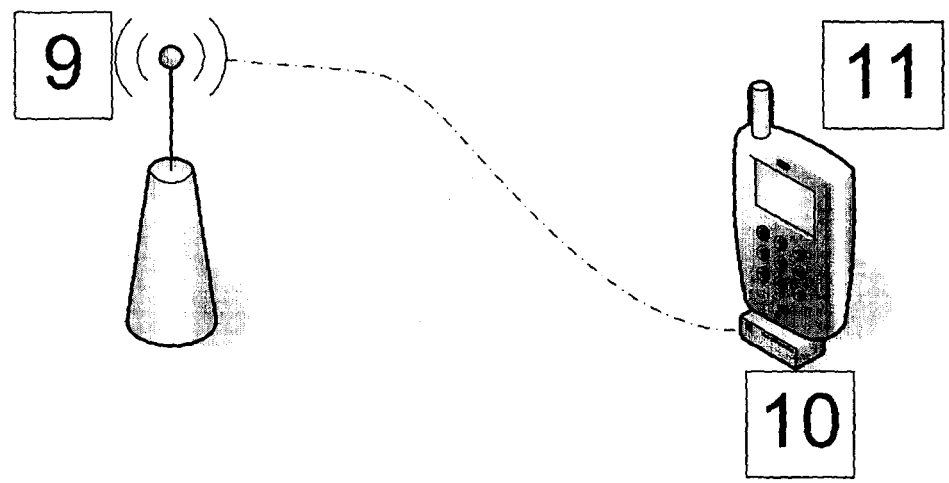
FIG. 3 is an illustration of the communication between the transmitter of the personal communications device and the base station of the preferred embodiment.

Referring now to FIG. 3, the base station 9 is a transceiver able to send a RF signal to a communication device add-on 10 which is also a transceiver. Add-on transceiver 10 is connected to communication device 11, either permanently or temporarily. It could also be integrated within the communications device housing. Both the base station 9 and the transceiver 10 can send and receive transmissions and are able to ping each other with a data transmission. If this back and forth ping is done with success, the communication device 11 linked to the add-on transceiver 10 is determined to be within the zone. On the other hand, if the back and forth ping cannot be completed successfully, the device 11 is determined to be outside of the zone. The base station has an antenna, an antenna of the type ant-2.4-cw-rct-rp by Nearson having been found to work well with the invention. It has a 2.4 GHz capacity. The whole base station module need not be very large since the components of the base station are few and small, the antenna being the biggest part of the base station.

Figure 4:
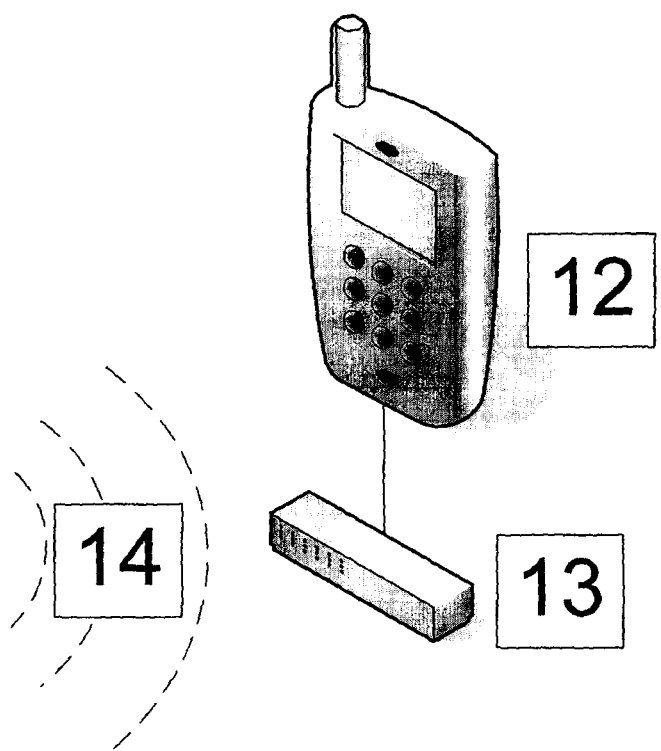
FIG. 4 is an illustration of the connection between the transmitter and the personal communications device.

As shown in FIG. 4, the add-on transceiver 13 is linked to the communication device 12. This enables the add-on transceiver 13 to, upon receiving a RF signal 14, control the communications device to execute a shut-down or power on. The add-on and base station transceivers are equipped with a microcontroller in order to analyze and encode the communication, preferably a digital bidirectional ping. The transceiver for the portable device can be integrated within the housing of the portable device or can be provided as an add-on 13. If it is provided as an add-on, it is preferably equipped with a connector able to mate with the charger connector of the portable device. The transceiver for the portable device preferably has its own antenna, an antenna of the type 4311-111-00245 provided by Linx Technologies having been found to work well with the invention. The transceiver for the mobile device is small and is adapted to be ergonomically fitted with the mobile device it is intended for, for the enjoyment by the user. If it is fully integrated, the resulting aspect of the mobile device equipped with the transceiver is even more appealing.

Figure 5:
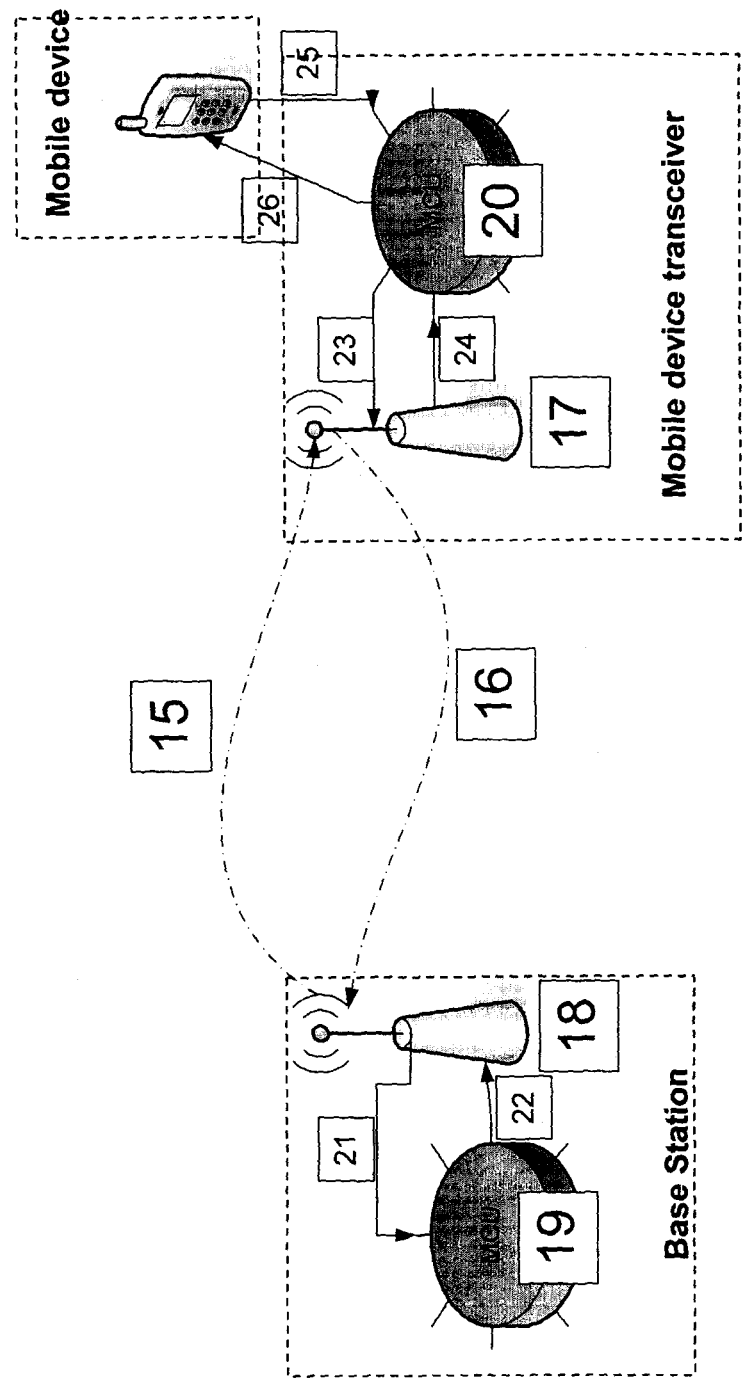
FIG. 5 is an illustration of the main components of the system of the preferred embodiment used to trigger a shut down or a power on of the personal communications device.

With reference to FIG. 5, the steps of an embodiment of the present invention will be detailed. In the microcontroller unit 19 is a zone definer for defining a critical zone to be one of within or outside a range. In the present example, the critical zone is defined as being within the range of the base station.

The add-on transceiver microcontroller unit 20 wakes up regularly, at predetermined time intervals, such as one minute, to start the ping communication. The microcontroller unit 20 sends 23 its own unique ID to the RF part of the add-on transceiver 17 (including both a transmitter and a receiver). The microcontroller unit 20 starts a timeout timer, the timeout timer having a duration of, for example, 50 millisecond. The signal is sent via wireless communication 15. The timeout timer, or a separate location timer, can be used to periodically trigger the transmission of a location message to the base station.

In the case where the communications device is within the reception range of the base station (and the base station is within the transmission range of the communications device), the signal is received by the RF part of the base station transceiver 18 (including both a transmitter and a receiver). The signal is then converted into a digital wired signal 21 by the transceiver 18. The signal is sent to the microcontroller of the base station 19. The signal is then encrypted using a known encryption key by the microcontroller 19. The signal is sent 22 to the RF part of the base station. The signal is sent via wireless communication 16.

The signal is received by the RF part of the add-on transceiver 17. The signal is sent 24 to the microcontroller 20 before expiry of the timeout timer. The microcontroller 20 correlates the signal to determine if the signal is from a known base station or just a signal picked up in error.

A location determiner inside the microcontroller 20 defines the location of the communications device to be within the range of the base station if the signal is from a known base station. If the signal is recognized to be from a known base station, a state modifier inside the microcontroller 20 triggers a shut-down or power on command (depending on the type of zone) and this is sent to the communications device 26. An acknowledge is received by the microcontroller 20 from the communication device 25 confirming that the command was executed and that the current state of the device is on or off. If the status is appropriate, the microcontroller 20 goes back to its sleep mode until the next time interval for verification is reached. In one embodiment, the state modifier will only trigger the power on or turn off command when a change of status of the communications device has been detected.

If the signal is not recognized to be from a known base station, the timeout timer of the add-on microcontroller 20 expires in due course. The microcontroller 20 tries to ping the base station once more by repeating the previous steps. In the case where the communications device is not within the reception range of the base station (and the base station is not within the transmission range of the communications device), the signal is never responded to by the base station. The timeout timer of the add-on microcontroller 20 expires in due course. The microcontroller 20 tries to ping the base station once more by repeating the previous steps. If the timeout timer expires a second time, the microcontroller 20 sends a status request to the communications device. The communications device responds with its status, namely on or off.

The microcontroller 20 verifies whether the status is appropriate depending on the type of zone. If the status is appropriate, the microcontroller 20 goes back to its sleep mode until the next time interval for verification is reached. If the status is inappropriate, namely the device has transitioned from within to outside a zone or the opposite, a shut-down or power on command (depending on the type of zone) is sent to the communications device 26. An acknowledgement is received by the microcontroller 20 from the communications device 25 confirming that the command was executed and that the current state of the device is on or off. If the status is appropriate, the microcontroller 20 goes back to its sleep mode until the next time interval for verification is reached.

In one embodiment of the present invention, the microcontroller 20 of the communications device includes a call forward module, which automatically forwards incoming communication calls to a separate number prior to turning the device off.

As will be readily understood, the above method could be modified substantially without departing from the invention. Indeed, the instigator of the verification could be the base station instead of the cellular phone. The time intervals could be chosen to be any other time intervals. The acknowledgement by the phone of its updated status is not required. Indeed, the acknowledgement confirms that the phone reacted to the command in the appropriate way, however, one could simply assume that the phone will receive and treat the command in the right way, without requiring an acknowledgement. In an alternative embodiment, the transceiver of the mobile device may only ping the base station once, even if no response is received. In this case, the default would be to assume that the mobile device is out of the range of the base station if the base station does not respond and the process would simply be halted until the next time for verification is reached. The transceiver of the mobile device does not have to first check the current status of the device prior to instructing it using the zone. Indeed, the command to power on or shut down the device could be sent even though the device would already be in power on or shut down mode. And so on.

At all times, it is possible for a user to manually bypass the status of his phone (powered on or shut down) by using the standard keys provided on the phone.

A plurality of phones could be controlled by one base station. Each phone could also relate and communicate with a plurality of base stations to define a multitude of zones.

Most cellular phone uses AT commands. Those commands are used for setting up things or command action. The commands used are often proprietary to one brand of devices but could be of the type below:

AT+CCFC params (for call forwarding)
AT+CFUN=0,0 (to shut down the wireless communication feature of the device)
AT+CFUN=0,1 (to power on the wireless communication feature of the device).

Figure 6:
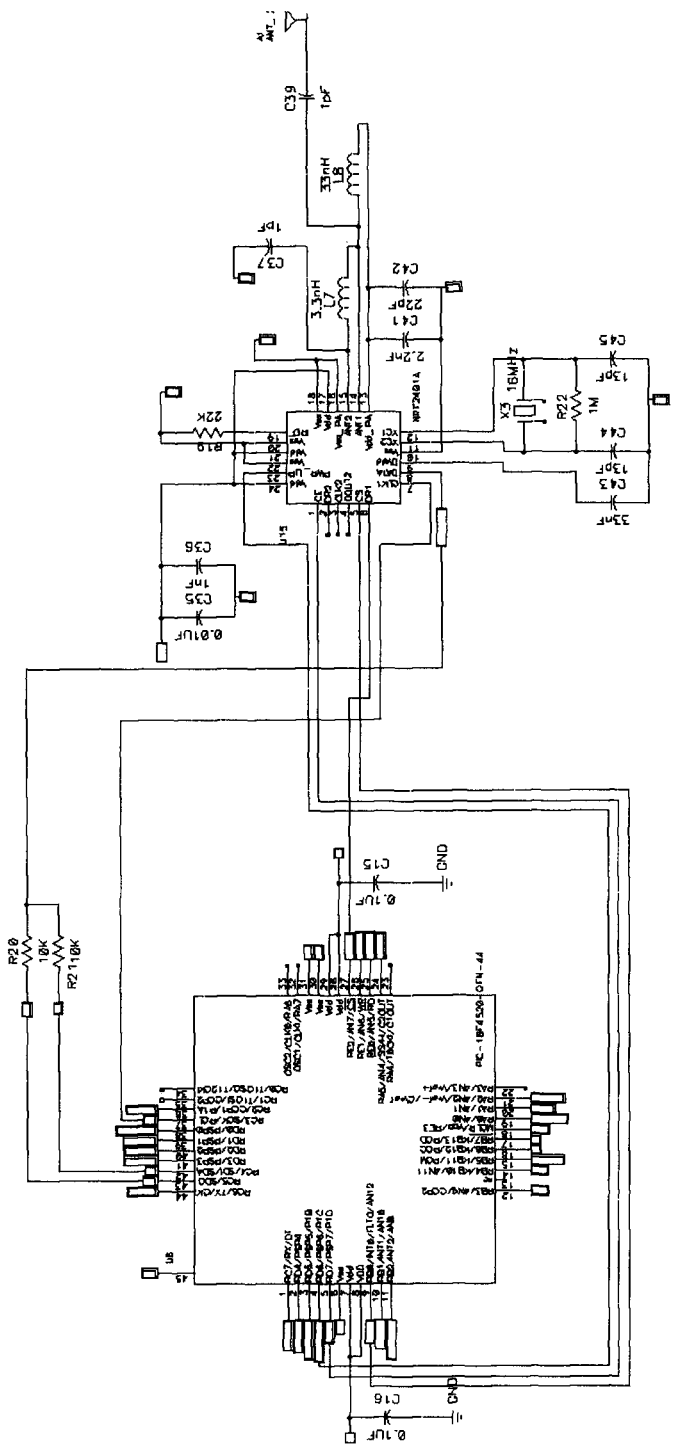
FIG. 6 is a detailed circuit diagram for the electronics of the microcontroller of the transmitter.
Figure 7:
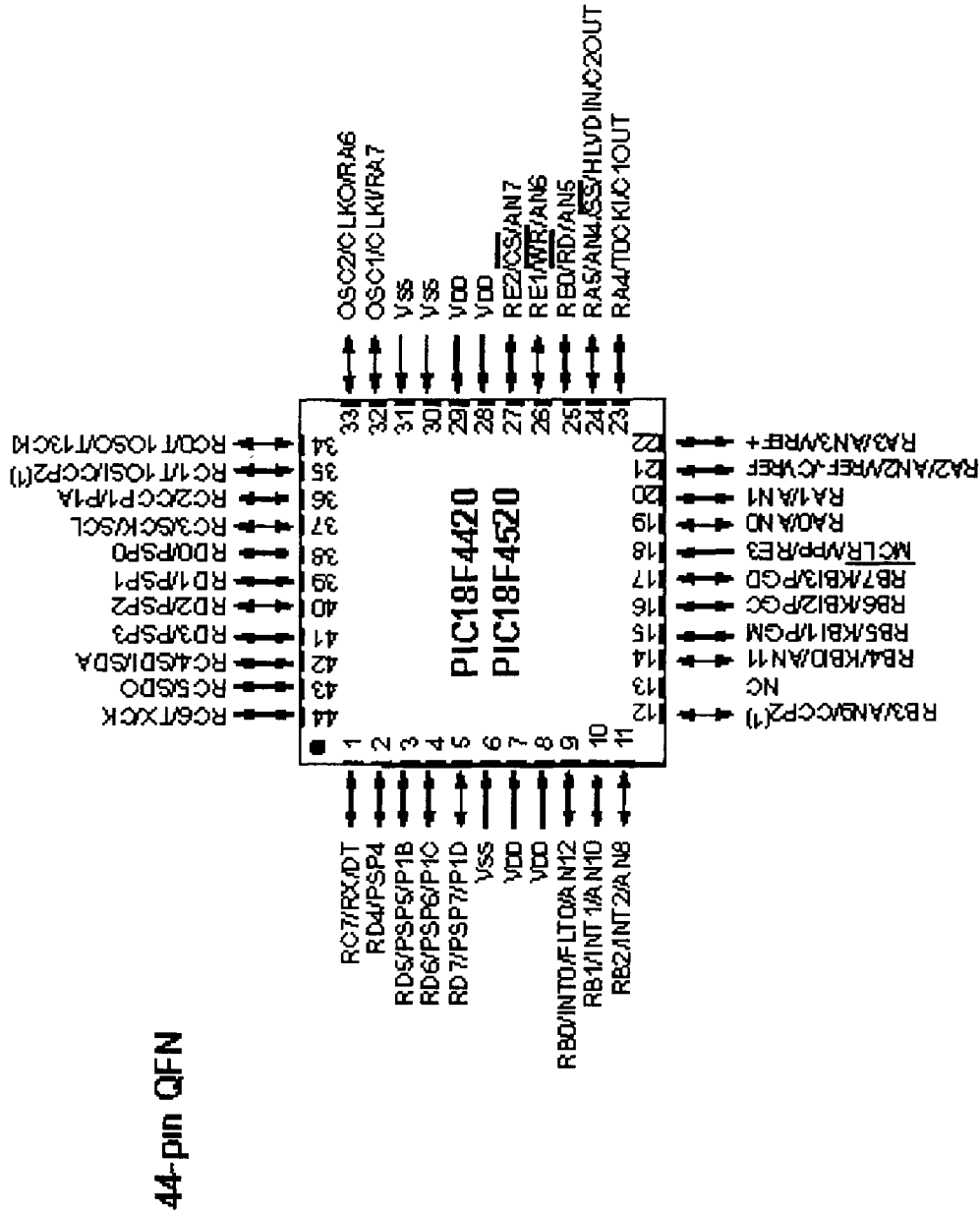
FIG. 7 is an illustration of a microcontroller Microchip PIC18F4520 QFN 44 pins.
Figure 8:
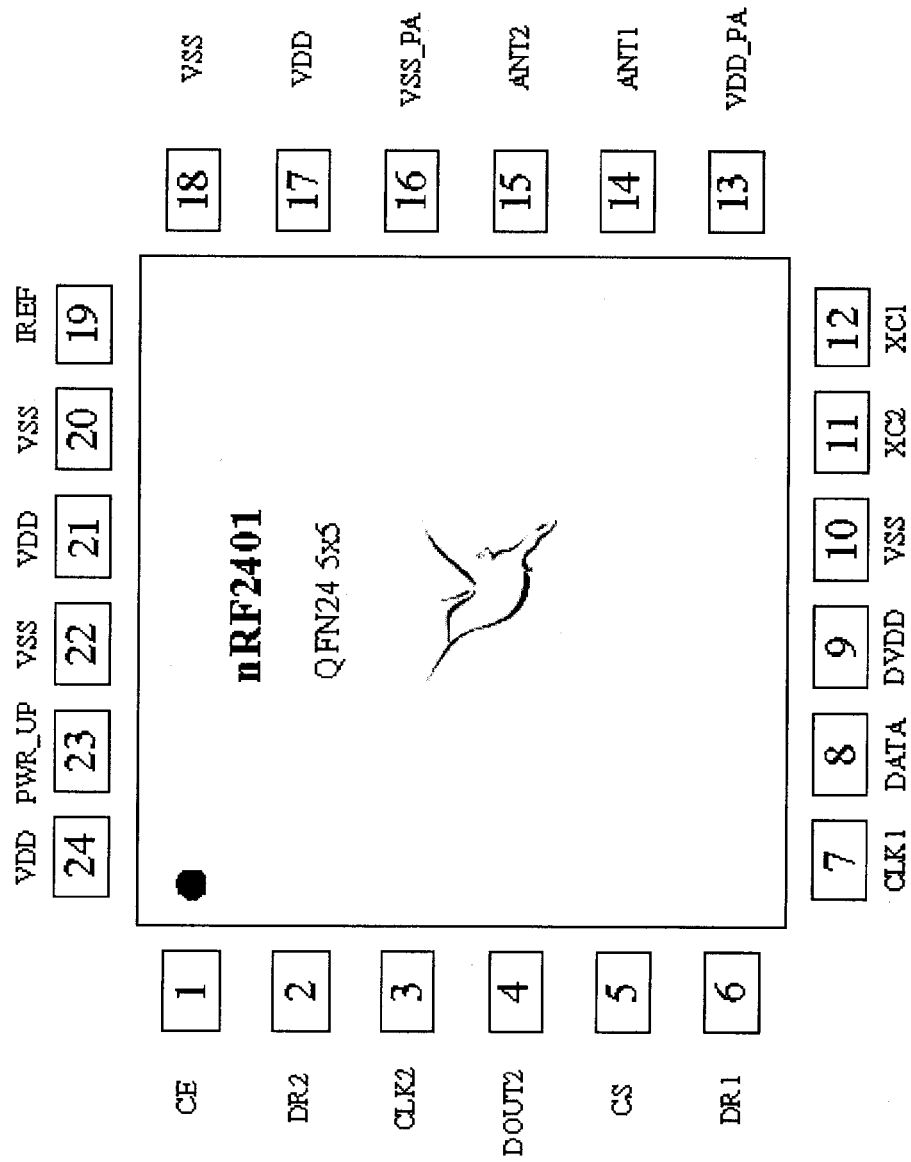
FIG. 8 is an illustration of a transceiver Nordic nRF2401.

The preferred embodiment for the base station and the add-on is a Microchip PIC18F4520 QFN 44 pins connected to a Nordic 2.4 GHz digital transceiver model nRF2401. FIG. 6 shows a preferred circuit diagram for the microcontroller and the transceiver, FIG. 7 shows the microcontroller Microchip PIC18F4520 QFN 44 pins itself and FIG. 8 shows the transceiver Nordic nRF2401 itself.

The embodiments of the invention described above are intended to be exemplary only. The scope of the invention is therefore intended to be limited solely by the scope of the appended claims.

What is claimed is:

1. A system for automatic powering on and turning off of a communications device for communications through a telecommunication network, the system comprising:
    a base station transceiver having a range and comprising:
        a zone definer for defining a critical zone to be one of within or outside said range;
        a base station transmitter for transmitting a message to the communications device;
        a base station receiver for receiving a message from said communications device;
    the communications device; and
    an add-on transceiver operatively connected to the communication device and
    including:
        a device transmitter for transmitting a message to said base station receiver;
        a device receiver for receiving a message from said base station transmitter;
        a location determiner for defining a location of said communications device to be within said range if a message is received by said device receiver from said base station transmitter; and
        a state modifier for triggering said communications device to one of powering on and turning off using said critical zone and said location of said communications device, said device transmitter and said device receiver of said add-on transceiver communicating with said base station transceiver when said communications device is powered on and turned off and said communications device being prevented from communications through the telecommunication network when turned off.

2. A system as claimed in claim 1, wherein said add-on transceiver comprising said device transmitter, device receiver, location determiner, and state modifier are integrated within a housing of said communications device.

3. A system as claimed in claim 1, wherein said state modifier is adapted to trigger said communications device to one of powering on and turning off only when a change of status of said communications device has been detected.

4. A system as claimed in claim 1, wherein said add-on transceiver comprises a location timer to periodically trigger a location message to be transmitted from said communications device to said base station transceiver.

5. A system as claimed in claim 1, wherein said add-on transceiver comprises a call forward module adapted to forward incoming communication calls to a separate number prior to said turning off.

6. A system as claimed in claim 1, wherein said location determiner and said state modifier are connected to said communications device via a charge connecter of said communications device.

7. A method for automatic powering on and turning off of a communications device for communication through a telecommunication network and having an add-on transceiver operatively connected thereto, the method comprising:
defining a critical zone to be one of within or outside a range of a base station transceiver;
sending a location message from one of said add-on transceiver of said communications device and said base station transceiver;
responding to said location message from the other one of said add-on transceiver of said communications device and said base station transceiver if said add-on transceiver of said communications device is within said range;
defining a location of said communications device to be within said range if said responding occurs; and
triggering said add-on transceiver to one of powering on and turning off said communications device using said critical zone and said location of said communications device, wherein the communications device is prevented from communicating through the telecommunication network when turned off and the communications device communicates with the telecommunication network when powered on and said add-on transceiver of said communications device communicates with the base station transceiver when the communications device is turned off and powered on.

8. A method as claimed in claim 7, wherein said location message is sent periodically using a location timer of said add-on transceiver of said communications device.

9. A method as claimed in claim 7, wherein said power off zone is within said range and said triggering comprises powering off said communications device when said location is within said power off zone.

10. A method as claimed in claim 7, wherein said sending comprises sending a communications device identification number.

11. A method as claimed in claim 7, wherein said responding comprises encrypting a response with a known encryption key.

12. A method as claimed in claim 7, further comprising triggering said add-on transceiver of said communications device to forward incoming communications calls to a separate number prior to said turning off of said communications device.

13. A system as claimed in claim 1, wherein the communications device comprises a first transceiver for communication through the telecommunication network, the first transceiver being turned off simultaneously with the communications device and communications through the telecommunication network being prevented when turned off.

14. A method as claimed in claim 7, wherein the communications device comprises a first transceiver for communication through the telecommunication network when powered on, the first transceiver being turned off when said communications device is turned off and preventing communication through the telecommunication network.

15. A system for automatic powering on and turning off of a communications device, the system comprising:
the communications device including a first transceiver for communication through a telecommunication network and an add-on second transceiver; and
a base station transceiver having a range and including:
a zone definer for defining a critical zone to be one of within or outside said range;
a base station transmitter for transmitting a location message to the add-on second transceiver of the communications device;
a base station receiver for receiving a location message from the add-on second transceiver of the communications device;
the add-on second transceiver including:
a device transmitter for transmitting the location message to the base station receiver;
a device receiver for receiving the location message from the base station transmitter;
a location determiner for defining a location of the communications device to be within said range if a message is received by the device receiver from the base station transmitter; and
a state modifier for triggering the communications device and the first transceiver to one of powering on and turning off using said critical zone and said location of the communications device, the device transmitter and the device receiver of the add-on second transceiver communicating with the base station transceiver when the communications device and the first transceiver are powered on and turned off, the first transceiver being prevented from communicating through the telecommunication network and with the base station transceiver when turned off and the first transceiver of the communications device communicating through the telecommunication networks when powered on.

16. A system as claimed in claim 15, wherein the state modifier is adapted to trigger the communications device and the first transceiver to one of powering on and turning off only when a change of status of said communications device with respect to said critical zone has been detected.

17. A system as claimed in claim 15, wherein the add-on second transceiver further comprises a location timer to periodically trigger the location message to be transmitted from the communications device to the base station transceiver.

18. A system as claimed in claim 15, wherein the add-on second transceiver comprises a call forward module adapted to forward incoming communication calls to the first transceiver to a separate number prior to said turning off of the communications device and the first transceiver.

19. A system as claimed in claim 15, wherein the location determiner and state modifier are connected to the communications device via a charge connector of the communications device.

20. A method for automatic powering on and turning off of a communications device having a first transceiver for communication through a telecommunication network and an add-on second transceiver operatively connected thereto, the method comprising:
- defining a critical zone to be one of within or outside a range of a base station transceiver;
- sending a location message from one of the add-on second transceiver of the communications device and the base station transceiver;
- responding to said location message from the other one of the add-on second transceiver of the communications device and the base station transceiver if the add-on second transceiver of the communications device is within said range;
- defining a location of the communications device to be within said range if said responding occurs; and
- triggering the add-on second transceiver to one of powering on and turning off the communications device and the first transceiver using said critical zone and said location of the communications device, wherein the first transceiver is prevented from communicating through the telecommunication network and the base station transceiver when turned off and the communications device communicates with the telecommunication network through the first transceiver when powered on.

21. A method as claimed in claim 20, wherein said location message is sent periodically using a location timer of the add-on second transceiver of the communications device.

22. A method as claimed in claim 20, wherein said power off zone is within said range and said triggering comprises powering off the communications device and the first transceiver when said location is within said power off zone.

23. A method as claimed in claim 20, further comprising triggering the add-on second transceiver of the communications device to forward incoming communications calls to a separate number prior to said turning off of the communications device and the first transceiver.

* * * * *